W. R. WILKIN.
RESAWING MACHINE.
APPLICATION FILED SEPT. 6, 1910.

999,475.

Patented Aug. 1, 1911.
2 SHEETS—SHEET 1.

Witnesses.
G. J. Mead
Florence Stockut.

Inventor.
William R. Wilkin
By J. C. & H. M. Sturgeon
Attys.

W. R. WILKIN.
RESAWING MACHINE.
APPLICATION FILED SEPT. 6, 1910.
999,475.
Patented Aug. 1, 1911.
2 SHEETS—SHEET 2.
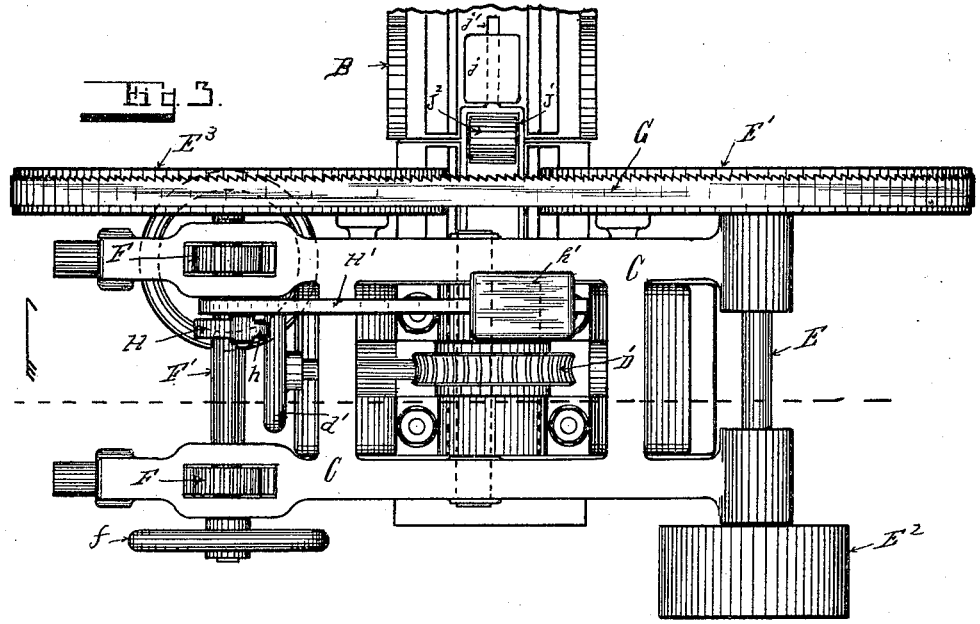
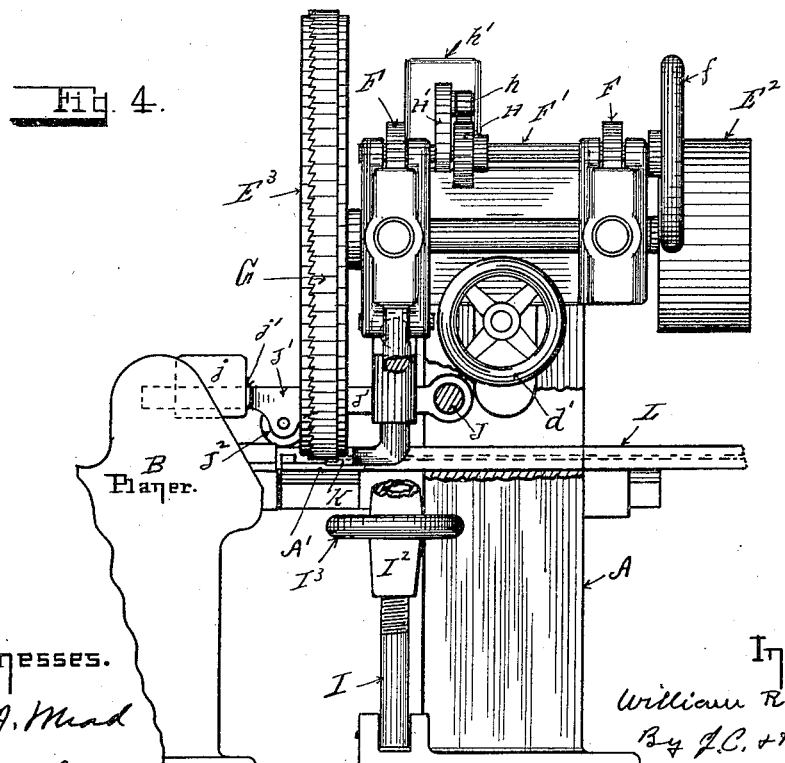
Witnesses.
G. J. Mead
Florence Stocket
Inventor.
William R. Wilkin
By J.C. & H.M. Stimpson
Attys.

UNITED STATES PATENT OFFICE.

WILLIAM R. WILKIN, OF ERIE, PENNSYLVANIA, ASSIGNOR TO THE STEARNS COMPANY, OF ERIE, PENNSYLVANIA, A CORPORATION OF PENNSYLVANIA.

RESAWING-MACHINE.

999,475.

Specification of Letters Patent.

Patented Aug. 1, 1911.

Application filed September 6, 1910. Serial No. 580,669.

*To all whom it may concern:*

Be it known that I, WILLIAM R. WILKIN, a citizen of the United States, residing at Erie, in the county of Erie and State of Pennsylvania, have invented certain new and useful Improvements in Resawing-Machines; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

Figure 1:
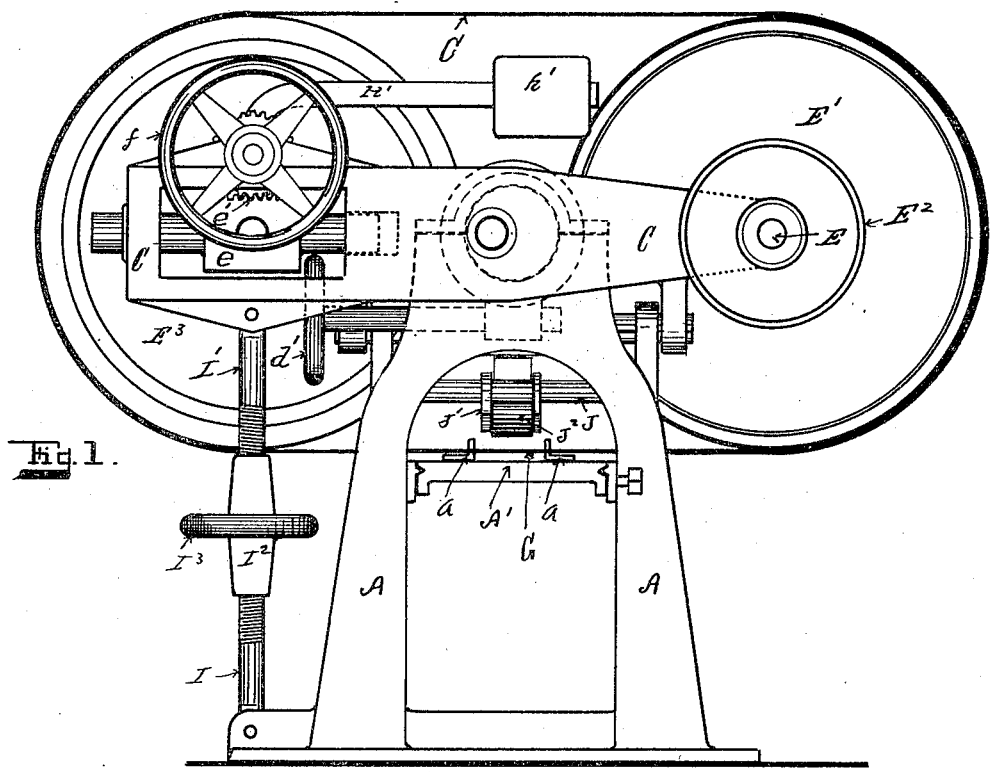
Figure 2:
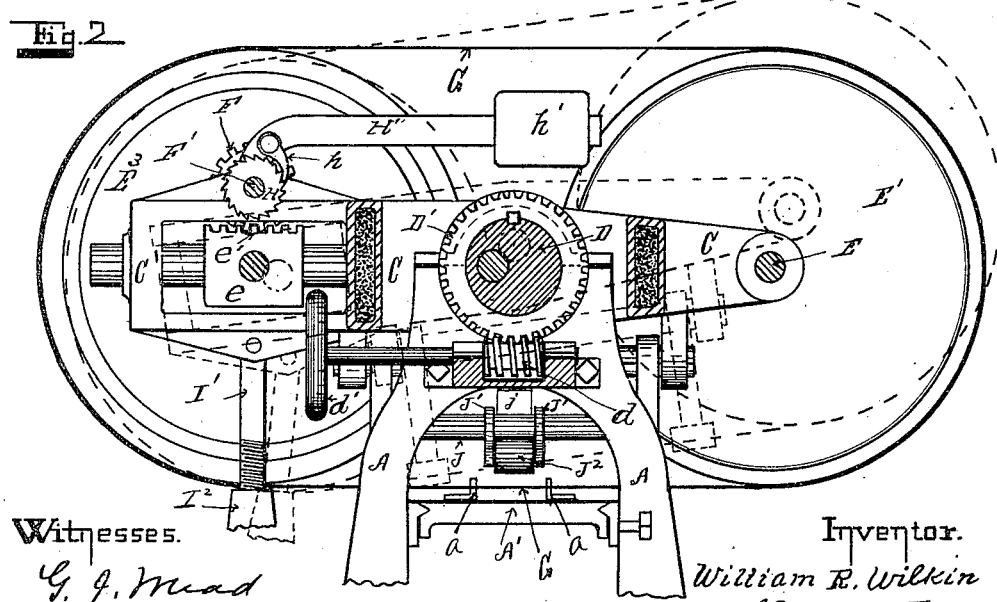

My invention relates to re-sawing machines, and has for its object the construction and combination of a re-sawing machine with a planer in such a manner that it will operate to re-saw lumber as it passes out of a planer, without the handling necessary with re-sawing machines as now constructed, in which combination said planer feeding mechanism operates as the feeding mechanism for the re-sawing machine. I accomplish this result by so constructing my improved re-sawing machine that the saw carrying mechanism thereof can be so adjusted that the saw will operate either parallel with the face of the planer bed, or at an angle thereto, so that lumber split thereby will be of even thickness at both edges thereof, or will be thicker at one edge than at the other, as may be desired. These and other features of my invention are hereinafter fully set forth and explained and illustrated in the accompanying drawings, in which:

Figure 1 is an end view in elevation of my improved re-sawing machine. Fig. 2 is a vertical section of the same on the line *x—x* in Fig. 3. Fig. 3 is a top or plan view of the same together with a section of the delivery end of a planer. Fig. 4 is a side view in elevation of the same.

In these drawings, A, indicates the frame of the re-sawing machine, and B, the rear or delivery end of a planer, showing the two machines combined and ready for operation.

A', indicates the bed-plate of the machine which is mounted on slides so as to be adjusted endwise between the legs of the machine-frame A.

On the frame, A, I mount an oscillatory frame, C, on an eccentric, D, which eccentric is provided with an annular rack gear, D', which is engaged and operated by a worm, d, and a hand-wheel, d', so as to raise and lower the frame C. In one end of the frame, C, I mount in suitable bearings a shaft E, provided with a saw-carrying wheel, E', and with a suitable pulley, E² by means whereof the wheel, E', can be driven; and in the opposite end of the frame, C, I mount another saw-carrying wheel, E³, in suitable bearings, e, in said frame; these bearings, e, being provided with racks, e', engaged by gears, F, on a shaft, F'. A hand-wheel, f, is provided on said shaft, F', whereby the wheel bearings, e, can be moved inward or outward as may be desired to accommodate the length of the saw, G, mounted on said wheels, E', and E³. For providing a suitable tension for the saw, G, I preferably secure a ratchet wheel, H, on the shaft, F, and pivot a lever, H', on said shaft provided with a dog, h, which engages the ratchet wheel, H. The lever, H', is also provided with a slidable weight, h', which operates through the lever, H', the dog, h, and ratchet wheel, H, to produce a suitable tension on the saw, G. For adjusting the plane of the frame, C, and of the saw, G, relatively to the bed, A', of the machine, I provide a rod I pivoted at one end to the base of the frame A, and a rod, I', pivoted to one end of the frame, C, said rods being provided at their adjacent ends with right and left screw-threads, upon which a turn-buckle, I², provided with a hand-wheel, I³, operates.

On the bed, A', of the machine there are laterally movable guides a, a; and mounted on a rod, J, secured to the frame, A, above the bed, A', there is a swinging arm, J', which extends outward in front of the edge of the saw, G, where it is provided with a roller, J², which operates on the top of a board, L, being re-sawed to hold it in close contact with the bed, A', during the sawing operation, as is clearly shown in Fig. 4. To bring the proper pressure on the roller J², an adjustable weight, j, is preferably mounted on an extension j', of the arm, J'. Secured to the frame, C, there are saw-guides, K, through which the saw, G, operates in the usual manner.

In operation this machine is secured in place at the rear or delivery end of a planing machine, so that the planes of the planer bed and of the bed, A', of the re-sawing machine coincide. The saw-carrying frame, C, is then adjusted so that the saw, G, will operate to split lumber issuing from, and being fed to it by, the planer, either on lines parallel with the beds of the planer and re-sawing machine, or at such angle thereto as the frame, C, may be adjusted to carry the saw, G, whereby the lumber will be re-sawed as it issues from the planer without further handling or manipulation. It is obvious, however, that my improved re-sawing machine can be used as a separate and distinct machine, and the lumber to be re-sawed fed thereto by hand in the usual manner. That is not however the primary idea of my invention, which is the construction of a re-sawing machine which can be combined with a planer so that lumber can be planed and re-sawed during substantially one operation, and without any manual or other attention thereto than that of the operation of the combined machines themselves.

Having thus described my invention so as to enable others to construct and operate the same, what I claim as new and desire to secure by Letters Patent is:

1. The combination in a horizontal band-saw machine of, a frame, a bed-plate secured in said frame, a supporting shaft mounted in the upper portion of said frame, a screw-gear on said shaft, a hand-wheel-shaft-and-worm mechanism adapted to rotate said shaft, eccentric trunnion pins secured in the ends of said shaft, a saw-supporting frame pivoted on said eccentric pins, band-saw wheel shafts journaled in said frame, band-saw wheels on said shafts, a band-saw mounted on said wheels, and adjustable means to secure said saw-supporting frame from oscillating on said trunnions, substantially as set forth.

2. The combination in a horizontal band-sawing machine of, an inverted U-shaped frame, a bed-plate mounted on slides between the legs of said frame, a shaft mounted in the upper part of said frame, a screw-gear on said shaft, hand-wheel, shaft and worm mechanism for operating said shaft, eccentric trunnion pins in the ends of said shaft, a saw-supporting frame pivoted on said pins, adjustable mechanism pivoted between the base of the machine frame and one end of said saw-supporting frame, a horizontal shaft mounted in one end of said saw-supporting frame, another shaft mounted in horizontally adjustable bearings in the opposite end of said frame, band-saw wheels secured on said shafts, a band-saw mounted on said wheels, and saw-guides depending from said saw-supporting frame, substantially as set forth.

3. In a horizontal band-saw machine the combination of an inverted U-shaped frame, a bed-plate secured between the legs of said frame, a presser shoe pivoted in said frame above said bed-plate, a supporting shaft journaled in said frame, a screw-gear on said shaft, eccentric trunnion pins on the ends of said shaft, a hand-wheel shaft journaled in said frame, a worm on said shaft intermeshing with said screw gear, a saw-supporting frame pivoted on said eccentric trunnion pins, rigid bearings on one end of said saw-supporting frame, adjustable bearings in the opposite end of said frame, shafts mounted in said bearings, band-saw wheels secured on said shafts, a band-saw mounted on said wheels, saw-guides depending from said saw-supporting frame, a turn-buckle mechanism pivoted to the base of the machine and to one end of said saw-supporting frame, and a driving pulley secured to one of said wheel-shafts, substantially as set forth.

In testimony whereof I affix my signature, in presence of two witnesses.

WILLIAM R. WILKIN.

Witnesses:
H. M. STURGEON,
P. V. GIFFORD.

---

Copies of this patent may be obtained for five cents each, by addressing the "Commissioner of Patents, Washington, D. C."